No. 891,904. PATENTED JUNE 30, 1908.
J. A. CALDWELL.
MECHANICAL STOKER.
APPLICATION FILED JAN. 18, 1908.
3 SHEETS—SHEET 3.
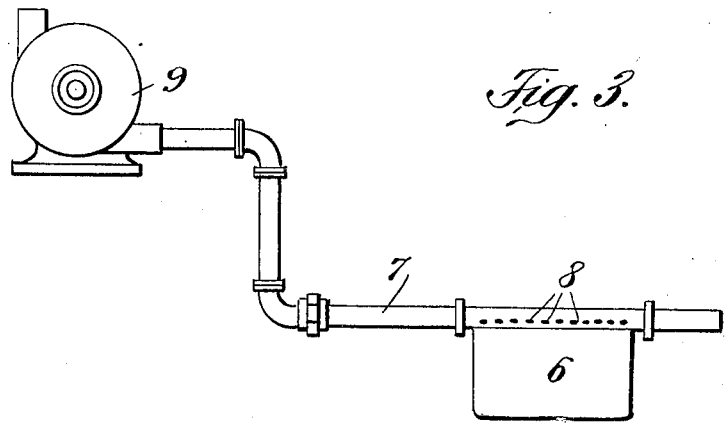
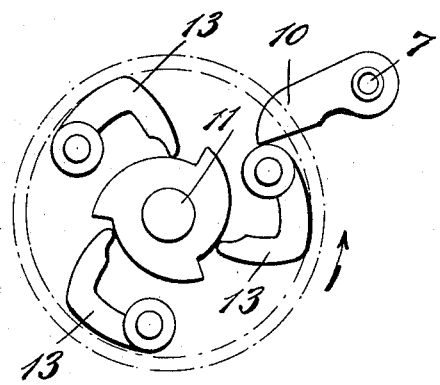
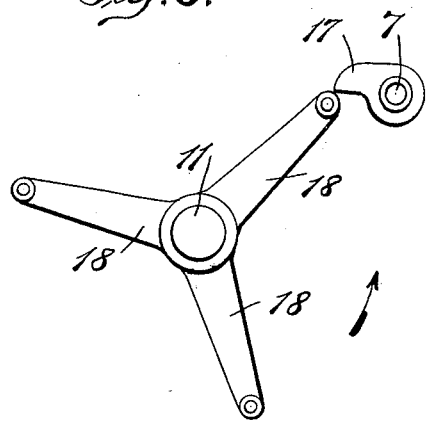

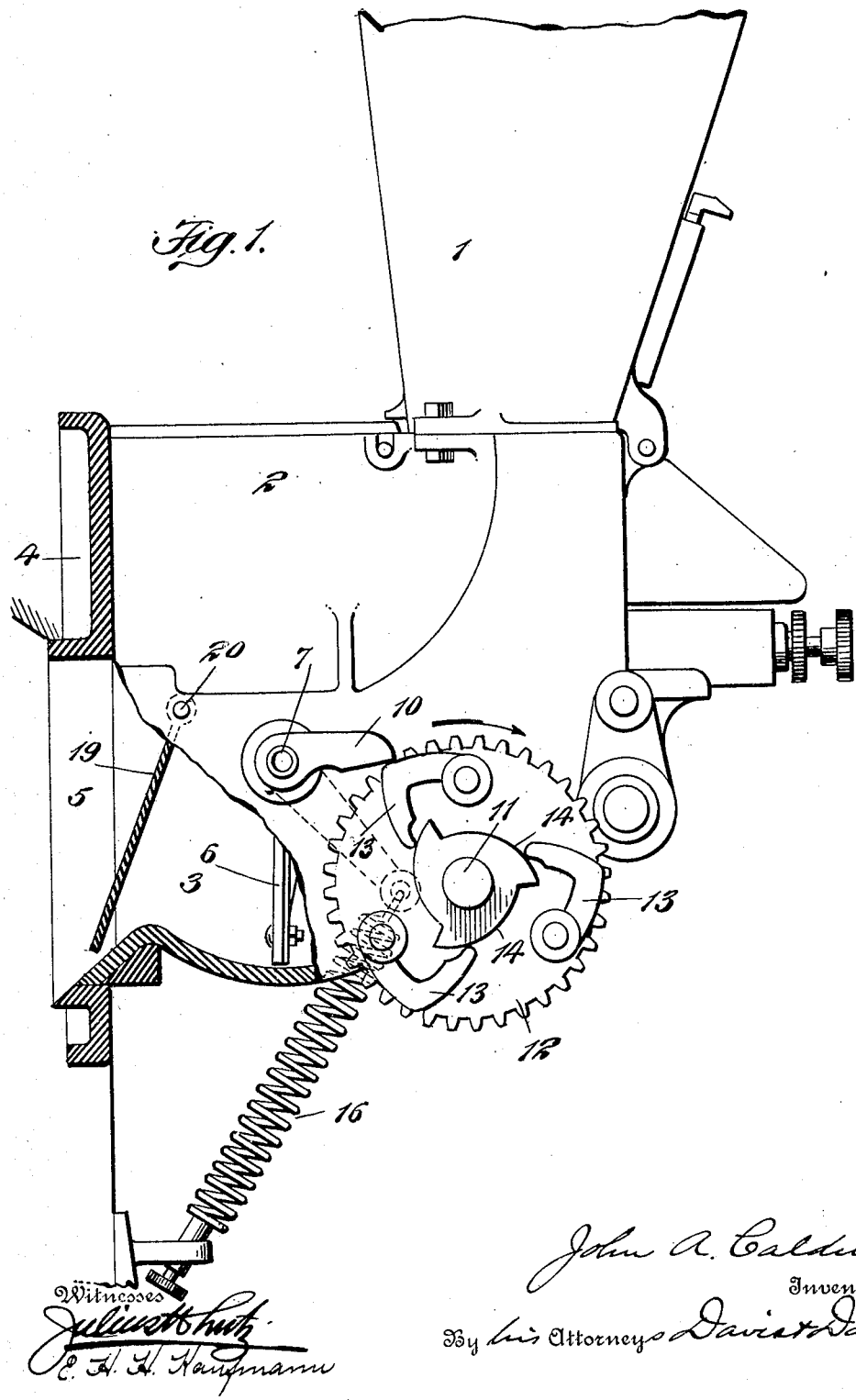

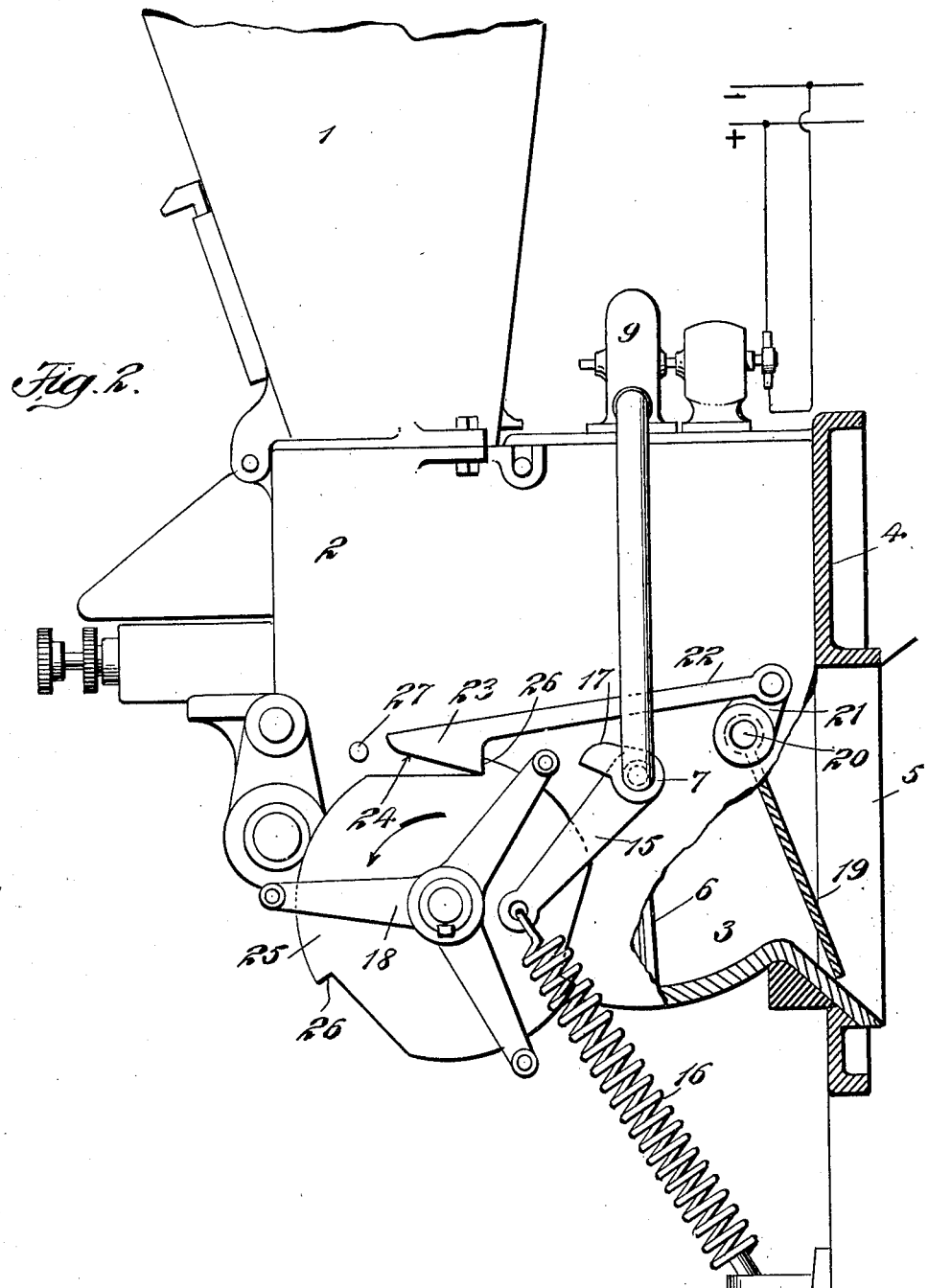

UNITED STATES PATENT OFFICE.

JOHN A. CALDWELL, OF MONTCLAIR, NEW JERSEY.

MECHANICAL STOKER.

No. 891,904.  Specification of Letters Patent.  Patented June 30, 1908.

Application filed January 18, 1908. Serial No. 411,418.

*To all whom it may concern:*

Be it known that I, JOHN A. CALDWELL, a citizen of the United States, residing at Montclair, county of Essex, State of New Jersey, have invented certain new and useful Improvements in Mechanical Stokers, of which the following is a specification, reference being had therein to the accompanying drawings, in which—

Figure 1 is a side elevation, a portion being broken away to more clearly show the construction; Fig. 2 a similar view from the opposite side of the furnace; Fig. 3 a detail view of the means for supplying air to the shovel shaft and to the shovel compartment; Fig. 4 a detail view showing the position of the shovel tappet and the actuating cams at their point of engagement; and Fig. 5 a detail view showing the position of the advanced tappet and one of the stoker arms when the shovel tappet is in position to be engaged by one of the actuating cams.

This invention relates to improvements in mechanical stokers, and is particularly adapted for use with the type of stoker shown in my Reissue Letters Patent No. 12,598, dated January 22nd, 1907.

One of the main objects of the invention is to provide means whereby the shovel tappet will be properly presented to the shovel-actuating cams. I have found that it occasionally occurs that the shovel tappet is not properly presented to the actuating cams and that the two cams become locked. By my improvements shown herein the shovel tappet is accurately positioned with respect to the advancing shovel-actuating cams and proper operation of the shovel by each cam is assured.

A further object of the invention is to provide an automatically operating protecting door or damper for closing the fuel opening, except during the brief interval occupied by the action of the shovel in throwing the fuel over the fire. This damper is preferably actuated from the shovel-actuating means.

Another object of the invention is to mount the shovel on a hollow shaft and to perforate said shaft within the shovel compartment, thereby securing a circulation of air through said shaft and into the shovel compartment. By this means the shovel shaft is maintained at a comparatively low temperature, which is obviously a great advantage, it being very desirable to keep the operating parts of the stoker at the lowest temperature possible under the conditions present in this type of apparatus.

Referring to the various parts by numerals, 1 designates the fuel hopper, 2 the ram compartment; 3 the shovel compartment, and 4 the face plate which supports the stoker mechanism and by which the mechanism is secured to the front of the furnace. The fuel opening through the face plate is designated by 5 and through said opening the fuel is discharged intermittently by the shovel.

The shovel 6 is mounted in the shovel compartment on a hollow shovel shaft 7. This shaft is horizontal and is mounted in suitable bearings, its ends projecting beyond the shovel compartment. Within the shovel compartment the shaft is perforated as at 8 whereby air may pass through the shaft and into the shovel compartment for the purpose of cooling said shaft and the shovel. Connected to one end of the shaft is a blower 9 which may be operated in any suitable manner and by which air may be blown into the shovel compartment around the shovel in order to cool the same.

The shovel depends from the shaft and is operated preferably by mechanism such as that shown in my Reissue Letters Patent hereinbefore referred to and I will describe only such part of the operating mechanism as may be necessary to make clear the operation of the present invention. On the shovel shaft, outside of the shovel compartment, is secured a shovel tappet 10. On the main or shovel-operating shaft 11 is mounted a gear 12 and to this gear is secured the shovel-operating cams 13. These cams are pivoted on said gear, their inner ends resting upon cam surfaces 14 and riding thereon for a purpose which is fully set forth in my said Reissue Letters Patent. The shovel-operating cams engage the shovel tappet during the rotation of the gear and swing the shovel rearward and then release it. Secured to the shovel shaft is an arm 15 to the lower end of which is connected a coil spring 16 said spring being connected to a permanent part of the furnace front, as shown clearly in the drawings. When the shovel is moved rearward in its compartment by the actuating cams the spring 16 is extended, and when the shovel tappet is released the shovel is moved forward rapidly by said spring.

I have found that occasionally the shovel tappet will not be properly presented to the actuating cams. To properly position the shovel tappet I secure to the shovel shaft an additional or advance tappet 17, and to the shovel actuating shaft I secure a striker 18 having three arms, one arm for each shovel actuating cam. These striker arms are so positioned that they engage the advanced tappet before the actuating cams engage the shovel tappet. The advanced tappet is short and has a very short range of movement and the striker arms engage it near its free end. The object of this is to have the advanced tappet and its striker arms engaged for a very brief interval of time. The movement of the advanced tappet under the action of the striker arms is just sufficient to bring the shovel tappet into proper position to be engaged by the actuating cams.

It will be readily understood that when the shovel is moved forward under the action of the spring the shovel tappet may be carried slightly beyond its proper position for engagement with the actuating cams and it is the purpose of the advanced tappet and its striker arms to lift the shovel tappet into its proper position.

To protect the shovel from the heat of the furnace while it is being drawn forward into position to throw the next charge of fuel into the furnace, I provide an automatically operated damper or gate 19 which is mounted on horizontal pivots 20 near the top of the fuel opening, the damper being broad enough to close said opening. One of the pivots of the shovel extends through the side wall of the shovel compartment and is provided with an arm 21. Connected to this arm is a forwardly extending gravity catch 22 having a head 23 which is formed on its under side with the forwardly and upwardly beveled surface 24. On the main shaft, in position to be engaged by the catch 22 is a ratchet 25 having three teeth 26 to correspond to the three shovel actuating cams. These teeth are so located with respect to the shovel-actuating cams and are so timed in their movements that they engage the catch 22 and swing the damper or shovel upward just before the shovel tappet is released from a shovel-actuating cam to lift the damper out of the path of the fuel thrown by the shovel. To release the catch 22 and permit the damper to drop to close the fuel opening I provide a stationary pin 27 which is adapted to engage the beveled surface 24 of the catch and to lift the catch free of the teeth on the disk. The damper arm 21 is quite short so that a very slight movement of the catch 22 will result in a considerable movement of the damper. The pin 27 is so located that it will free the catch 22 from its actuating disk the instant the shovel has completed its fuel throwing movement. It will thus be seen that the gate or damper is down or in its closed position at all times except during the fuel throwing movement of the shovel and that, therefore, the shovel and the shovel shaft are protected from the furnace heat during the greater portion of the time. It will also be noted that should the operation of the shovel be interrupted at any time the damper will protect it from the heat of the furnace.

In the diagrammatic views shown in Figs. 4 and 5 the relative positions of the shovel tappet and the advanced tappet are shown. In these views one of the striker arms 18 is about to release the advanced tappet 17, and one of the actuating cams is about to engage the shovel tappet.

Having thus described my invention, what I claim as new and desire to secure by Letters Patent, is:—

1. A mechanical stoker comprising a shovel compartment, a shovel shaft mounted therein and carrying a shovel, a shovel tappet on said shaft, a tension means connected to the shovel shaft and adapted to move the shovel in one direction, means for engaging said tappet to move the shovel shaft in opposition to the tension means, and means to move the shovel shaft to present the shovel tappet to its actuating means.

2. A mechanical stoker comprising a shovel compartment, a shovel shaft mounted therein and carrying a shovel, a shovel tappet on said shaft, a tension means connected to the shovel shaft and adapted to move the shovel in one direction, a shovel actuating shaft, means carried by said shovel actuating shaft to engage a shovel tappet and to move the shovel shaft in opposition to the tension means, and means actuated by said shovel actuating shaft to move the shovel shaft and to present the shovel tappet to its actuating means.

3. A mechanical stoker comprising a shovel compartment, a shovel shaft mounted therein and carrying a shovel, a shovel tappet on said shaft, a tension means connected to the shovel shaft and adapted to move the shovel in one direction, a shovel actuating shaft, means carried by said shovel actuating shaft to engage the shovel tappet and to move the shovel shaft in opposition to the tension means, an advanced tappet on the shovel shaft, and means on the shovel actuating shaft to engage said advanced tappet to position the shovel tappet for engagement by its actuating means.

4. A mechanical stoker comprising a shovel compartment, a shovel shaft mounted therein and carrying a shovel, a shovel tappet on said shaft, a tension means connected to the shovel shaft and adapted to move the shovel in one direction, a shovel actuating shaft carrying a series of cams adapted to engage the shovel tappet in succession, an advanced tappet on the shovel shaft, a striker device on the shovel actuating shaft having a series of arms to correspond with the shovel actuating cams, said striker arms being adapted to engage the advanced tappet slightly in advance of the engagement of the shovel actuating cams with the shovel tappet to position the shovel tappet for engagement with the shovel-actuating cams.

5. A mechanical stoker comprising a shovel compartment, an oscillating shovel mounted therein, means for oscillating the shovel, a pivoted damper, means for intermittently connecting said damper to the shovel oscillating means to swing said damper on its pivot in advance of the fuel-throwing movement of the shovel, and means to automatically release the damper from the shovel oscillating means when the full throwing movement of the shovel is completed.

6. A mechanical stoker comprising a shovel compartment, an oscillating shovel mounted therein, means for oscillating said shovel, a damper pivoted at its upper end and adapted to close the fuel opening from the shovel compartment, an arm connected to said shovel and rotatable means for temporarily engaging said arm to swing said shovel on its pivot just prior to the fuel throwing movement of the shovel, and a stationary device adapted to be engaged by and to release said arm when the fuel-throwing movement of the shovel is completed.

7. A mechanical stoker comprising a shovel compartment, an oscillating shovel mounted therein, means for operating said shovel, a pivoted damper, an arm secured thereto, a rotatable device for engaging said arm to swing the damper on its pivot just prior to the fuel-throwing movement of the shovel, and a stationary pin to engage said arm to release the damper when the shovel has completed its fuel-throwing movement.

8. A mechanical stoker comprising a shovel compartment, a shovel shaft mounted therein, a shovel connected to said shaft, a tension means connected to said shaft and adapted to move the shovel in one direction, a shovel-actuating shaft, a series of cams carried thereby and adapted to engage the shovel tappet and to move the shovel shaft in opposition to the tension means, an advanced tappet secured to the shovel shaft, and a striker device carried by the shovel-operating shaft and adapted to engage the advanced tappet to position the shovel tappet.

9. A mechanical stoker comprising a shovel compartment, a shovel shaft mounted therein, a shovel connected to said shaft, a tension means connected to said shaft and adapted to move the shovel in one direction, a shovel-actuating shaft, a series of cams carried thereby and adapted to engage the shovel tappet and to move the shovel shaft in opposition to the tension means, an advanced tappet secured to the shovel shaft, and a striker device secured to the shovel actuating shaft and provided with a series of arms each of said arms being adapted to engage the advanced tappet to position the shovel tappet, the striker arms corresponding in number to the shovel actuating cams.

10. A mechanical stoker comprising a shovel compartment, a horizontal hollow shovel shaft mounted therein, said shaft being provided with perforations within the shovel compartment to permit air to pass from said shovel shaft into said compartment, means for actuating said shovel shaft, and a shovel carried by said shaft.

11. A mechanical stoker comprising a shovel compartment, a horizontal hollow shovel shaft mounted therein, said shaft being provided with perforations within the shovel compartment to permit air to pass from said shovel shaft into said compartment, means for actuating said shovel shaft, a shovel carried by said shaft, and means for forcing air into the shovel compartment around the shovel.

12. A mechanical stoker comprising a shovel compartment, a horizontal hollow shovel shaft mounted therein, said shaft being provided with perforations within the shovel compartment to permit air to pass from said shovel shaft into said compartment, means for actuating said shovel shaft, a shovel carried by said shaft, and means for forcing air through the shovel shaft into the shovel compartment.

13. A mechanical stoker comprising a shovel compartment, a shovel shaft mounted therein and carrying a shovel, a shovel tappet on said shaft, a tension means connected to the shovel shaft and adapted to move the shovel in one direction, a shovel actuating shaft carrying a series of shovel actuating cams adapted to engage the shovel tappet in succession to move the shovel in opposition to the tension means, a pivoted damper, an arm connected thereto, means carried by the shovel actuating shaft to engage said arm to swing the damper on its pivot just prior to the release of the shovel tappet, and means to release said arm when the shovel has completed its fuel throwing movement.

14. A mechanical stoker comprising a shovel compartment, a shovel shaft mounted therein and carrying a shovel, a shovel tappet on said shaft, a tension means connected to the shovel shaft and adapted to move the shovel in one direction, a shovel-actuating shaft carrying a series of shovel-actuating cams adapted to engage the shovel tappet in succession to move the shovel in opposition to the tension means, means on the shovel-actuating shaft to swing the damper on its pivot prior to the release of the shovel by each of the shovel-actuating cams, and means to release the damper after each fuel throwing movement of the shovel.

15. A mechanical stoker comprising a shovel shaft, a shovel secured thereto, a shovel tappet on said shaft, means to rock the shovel shaft to move the shovel in one direction, means for engaging the shovel tappet to move the shovel shaft in the other direction, and means to rock the shovel shaft to present the shovel tappet to its engaging means.

16. A mechanical stoker comprising a shovel shaft, a shovel secured thereto, means to support a charge of fuel in front of the shovel, a tension means adapted to move the shovel in one direction to throw the fuel into the furnace, means for engaging the shovel tappet to move the shovel in opposition to the tension means and to release the same to permit it to make its fuel throwing movement, and means to rock the shovel shaft to present the shovel tappet to its engaging means.

In testimony whereof I hereunto affix my signature in the presence of two witnesses this 11th day of January 1908.

JOHN A. CALDWELL.

Witnesses:
 WM. R. DAVIS,
 EMMA H. H. KAUFMANN.